United States Patent
Hall et al.

(10) Patent No.: US 10,603,952 B2
(45) Date of Patent: Mar. 31, 2020

(54) AUTOMOTIVE WHEEL WITH SPOKE ASSEMBLIES ON OPPOSING SIDES

(71) Applicants: David R. Hall, Provo, UT (US); Stephen R. Hall, Draper, UT (US); Christopher Johnson, Provo, UT (US); Jason Simpson, Provo, UT (US); Jedediah Knight, Provo, UT (US)

(72) Inventors: David R. Hall, Provo, UT (US); Stephen R. Hall, Draper, UT (US); Christopher Johnson, Provo, UT (US); Jason Simpson, Provo, UT (US); Jedediah Knight, Provo, UT (US)

(73) Assignee: Hell Labs LLC, Provo, UT (US)

( * ) Notice: Subject to any disclaimer, the term of this patent is extended or adjusted under 35 U.S.C. 154(b) by 345 days.

(21) Appl. No.: 15/334,724

(22) Filed: Oct. 26, 2016

(65) Prior Publication Data
US 2018/0111413 A1   Apr. 26, 2018

(51) Int. Cl.
*B60B 3/08* (2006.01)
*B60B 3/10* (2006.01)
*B60B 27/00* (2006.01)
*B60T 1/06* (2006.01)
*F16D 65/12* (2006.01)

(52) U.S. Cl.
CPC ............... *B60B 3/085* (2013.01); *B60B 3/10* (2013.01); *B60B 27/0052* (2013.01); *B60T 1/065* (2013.01); *F16D 65/12* (2013.01); *B60B 2900/70* (2013.01)

(58) Field of Classification Search
CPC .. B60B 3/08; B60B 3/085; B60B 3/10; B60B 3/16; B62L 1/00; F16D 65/12; B60T 1/065
See application file for complete search history.

(56) References Cited

U.S. PATENT DOCUMENTS

| | | | | |
|---|---|---|---|---|
| 1,927,358 A * | 9/1933 | Breguet | ................. | F16D 55/06 188/152 |
| 2,040,589 A * | 5/1936 | Avery | ....................... | B60B 3/08 188/366 |
| 2,267,263 A * | 12/1941 | Berger | .................... | F16D 55/06 188/264 G |
| 2,381,166 A * | 8/1945 | Hollerith | ................ | F16D 55/06 188/18 R |
| 3,334,946 A * | 8/1967 | Strobel | ................... | B60B 11/06 188/170 |

(Continued)

*Primary Examiner* — Jason R Bellinger

(57) ABSTRACT

A wheel assembly for an automotive vehicle is described herein. The assembly includes a cylindrical rim, a tire around the rim, two spoke assemblies, a wheel hub, a brake assembly, and a mounting arm. The rim is symmetrical, and has a first flange on a first side of the rim and a second flange on a second side of the rim. The tire is disposed around the rim. The first spoke assembly is coupled to the first flange and has a hub-mounting structure at its center. The second spoke assembly is coupled to the second flange and has an opening at its center. The wheel hub and brake assembly are disposed inside the rim between the first and second spoke assemblies, coupled to the hub-mounting structure. The mounting arm passes through the opening at the center of the second spoke assembly and couples the wheel assembly to the vehicle.

19 Claims, 16 Drawing Sheets

(56) References Cited

U.S. PATENT DOCUMENTS

| | | | | |
|---|---|---|---|---|
| 5,732,798 | A * | 3/1998 | Toson | B62L 1/00 |
| | | | | 180/219 |
| 6,892,841 | B2 * | 5/2005 | Makuta | B60T 1/067 |
| | | | | 180/65.51 |
| 6,899,400 | B1 * | 5/2005 | Cook | B60B 7/20 |
| | | | | 301/37.25 |
| 7,475,950 | B1 * | 1/2009 | Glenn | B60B 3/085 |
| | | | | 188/17 |
| 8,833,863 | B2 * | 9/2014 | Schmidt | B60B 3/14 |
| | | | | 188/18 A |
| 2012/0292978 | A1 * | 11/2012 | Buschjohann | B60G 21/051 |
| | | | | 301/6.5 |

* cited by examiner

AUTOMOTIVE WHEEL WITH SPOKE ASSEMBLIES ON OPPOSING SIDES

TECHNICAL FIELD

This invention relates generally to the field of passenger- and cargo-carrying automotive vehicles, and more specifically to automotive wheels.

BACKGROUND

The wheel is the original marvel of human ingenuity. Though it was first invented millennia ago, it continues to be used and improved in every aspect of modern society. And, the usefulness of the wheel is none more obvious than on passenger- and cargo-carrying vehicles. The general design is simple, and includes a hub connected to a rim by spokes. However, as such vehicles have become more advanced, and as vehicle design and functionality has become more varied, wheel design has also had to adapt. However, few solutions have been presented for the dynamics of three-wheeled vehicles that differ from two- and four-wheeled vehicles. Most solutions presented have focused on the shocks and mounting arms, borrowing wheels from two- and four-wheeled designs. Thus, there is room for improvement in designing wheels for three-wheeled vehicles.

SUMMARY OF THE INVENTION

A wheel assembly for a motorized passenger or cargo vehicle, especially for three-wheeled vehicles, is described herein that addresses the concerns briefly mentioned above. In general, the assembly includes a cylindrical rim, a tire around the rim, a first spoke assembly, a second spoke assembly, a wheel hub, a brake assembly, and a mounting arm. The rim is symmetrical, and has a first flange on a first side of the rim and a second flange on a second side of the rim, each flange encircling the rim. The tire is disposed around the rim between the flanges. The first spoke assembly is coupled to the first flange and has a hub-mounting structure at its center. The second spoke assembly is coupled to the second flange and has an opening at its center. The wheel hub is disposed inside the rim between the first and second spoke assemblies, coupled to the hub-mounting structure. The brake assembly is disposed inside the rim and coupled to one or more of the wheel hub or the hub-mounting structure. The mounting arm is coupled to one or more of the hub-mounting structure, the wheel hub, or the brake assembly, and passes through the opening at the center of the second spoke assembly. Additionally, the mounting arm couples the wheel assembly to the motorized passenger or cargo vehicle.

The dual spoke assembly construction provides several benefits. First, the additional spoke assembly provides additional protection to the hub and brake assembly from road debris. Second, the additional spoke assembly provides extra support to the rim, especially for wide rims. Third, the additional spoke assembly provides an additional mounting point for the hub and/or mounting arm, thereby increasing the overall strength of the wheel assembly. Those of skill in the art recognize other benefits not mentioned but inherent in the design of the wheel described herein.

BRIEF DESCRIPTION OF THE DRAWINGS

A more particular description of the invention briefly described above is made below by reference to specific embodiments. Several embodiments are depicted in drawings included with this application, in which.

DETAILED DESCRIPTION

A detailed description of the claimed invention is provided below by example, with reference to embodiments in the appended figures. Those of skill in the art will recognize that the components of the invention as described by example in the figures below could be arranged and designed in a wide variety of different configurations. Thus, the detailed description of the embodiments in the figures is merely representative of embodiments of the invention, and is not intended to limit the scope of the invention as claimed.

The descriptions of the various embodiments include, in some cases, references to elements described with regard to other embodiments. Such references are provided for convenience to the reader, and to provide efficient description and enablement of each embodiment, and are not intended to limit the elements incorporated from other embodiments to only the features described with regard to the other embodiments. Rather, each embodiment is distinct from each other embodiment. Despite this, the described embodiments do not form an exhaustive list of all potential embodiments of the claimed invention; various combinations of the described embodiments are also envisioned, and are inherent from the descriptions of the embodiments below. Additionally, embodiments not described below that meet the limitations of the claimed invention are also envisioned, as is recognized by those of skill in the art.

The vehicles referred to herein refer generally to automotive passenger- and cargo-carrying, street-legal and off-road vehicles. "Street-legal" and "off-road" are understood to be terms of art referring to vehicles that are legally operable on highways and/or city streets, and/or recreational vehicles typically driven off-road. Examples of such include cars, vans, trucks, ATVs, UTVs, and motorcycles. Additionally, in some cases, the vehicles referred to herein include aircraft and/or amphibious vehicles.

Figure 1:
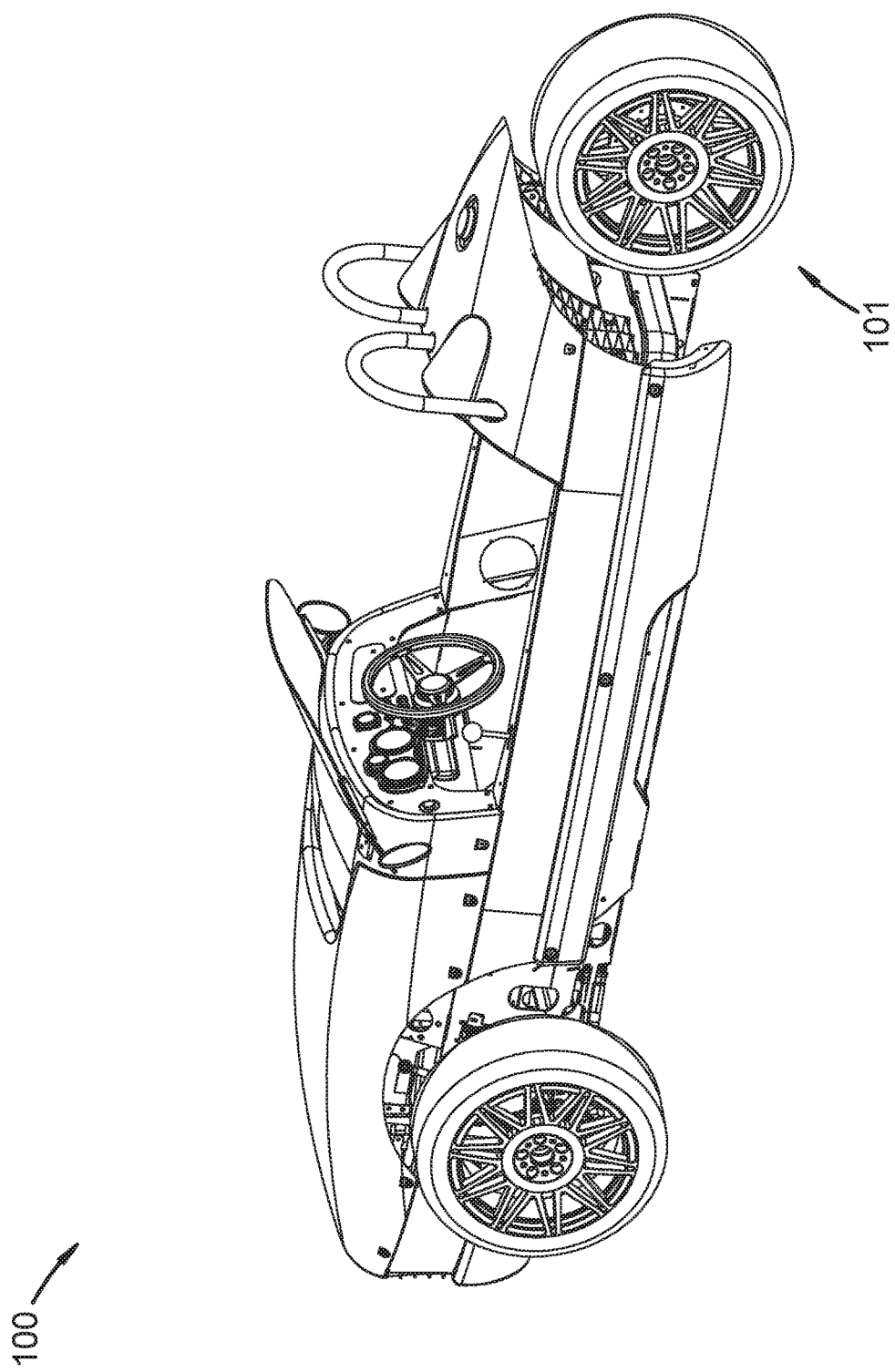
FIG. 1 depicts one embodiment of a vehicle employing a wheel assembly according to the claimed invention.
Figure 2A:
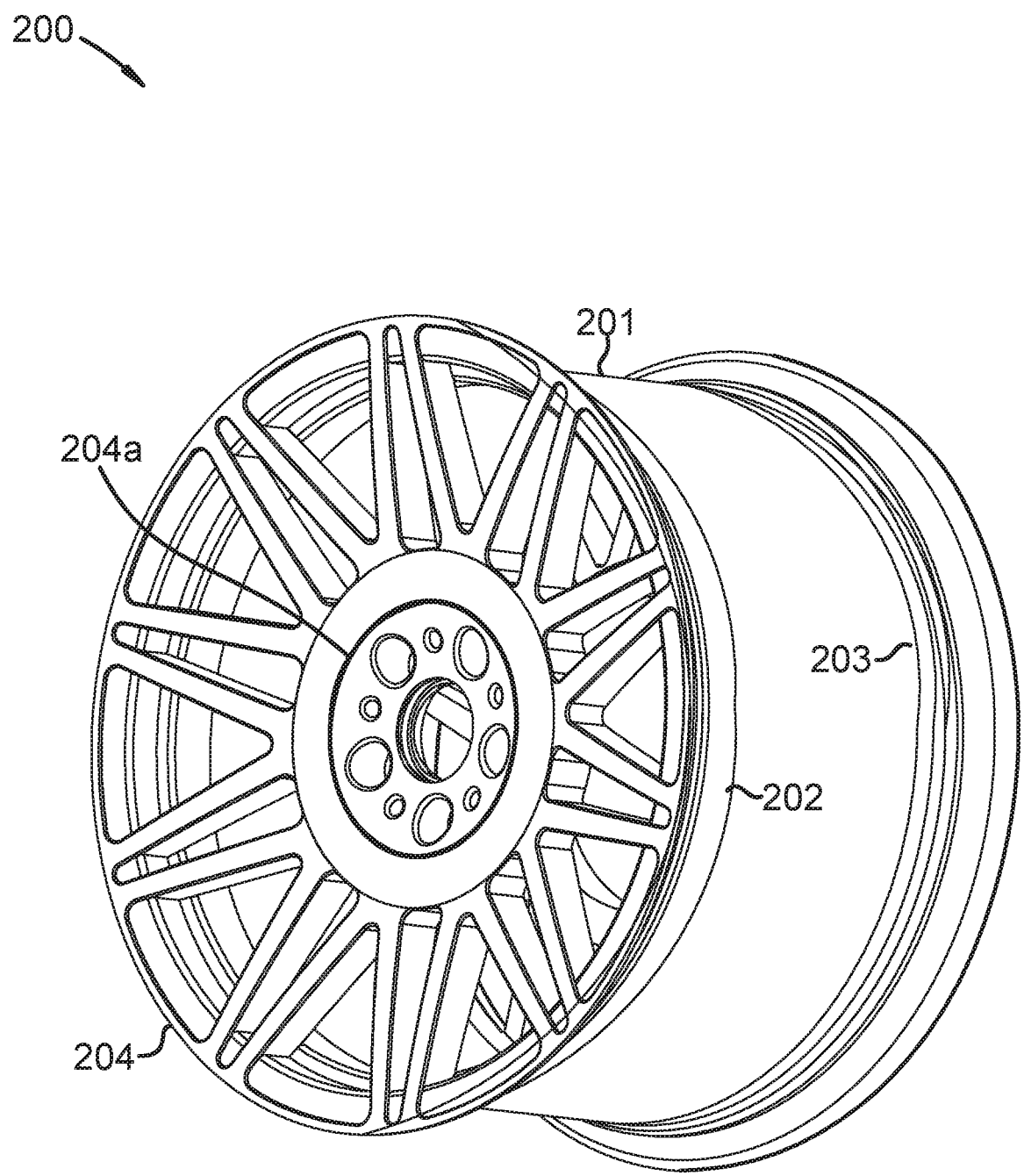
FIGS. 2A-F depict various views of a two-faced wheel according to the claimed invention.
Figure 2B:
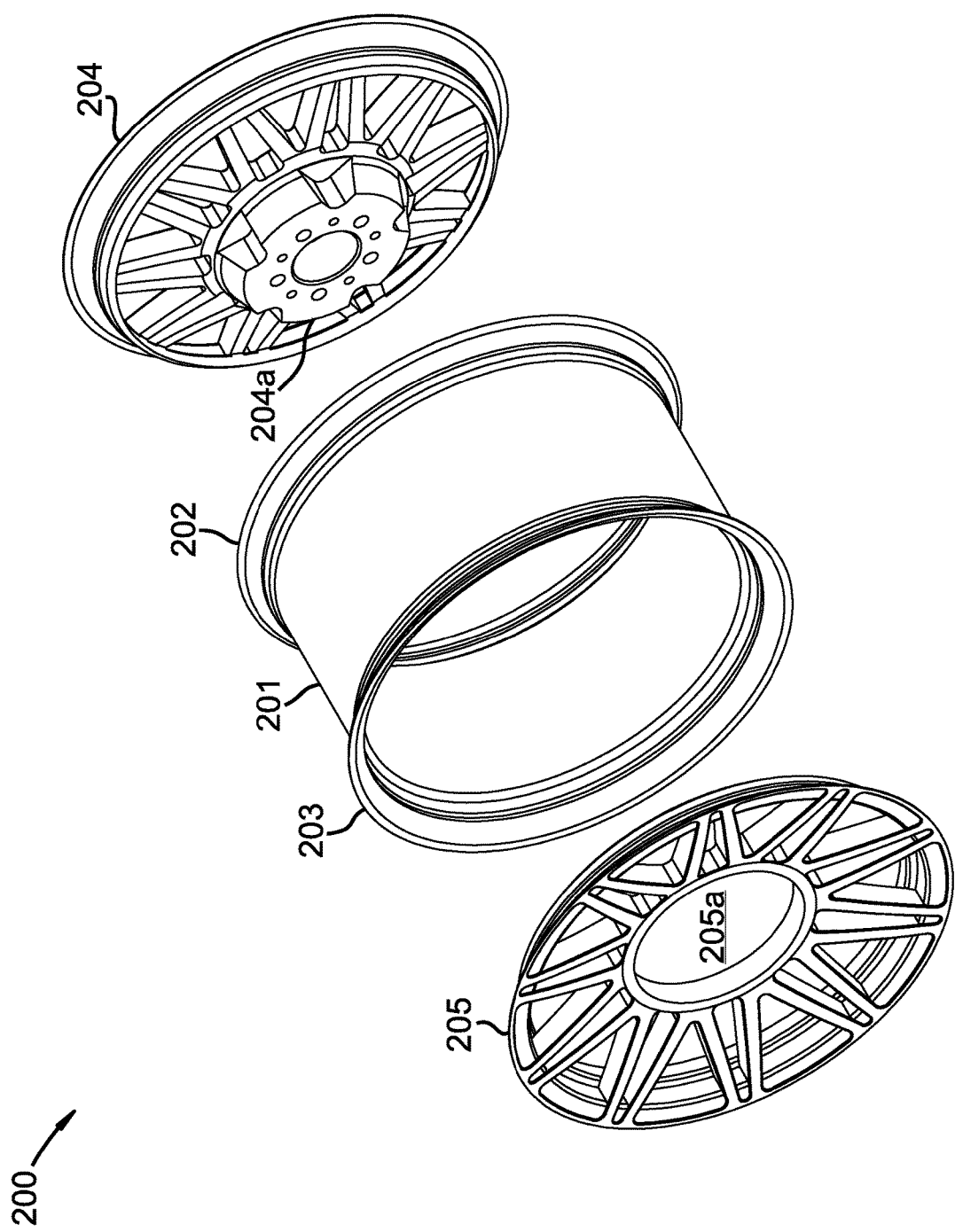
Figure 2C:
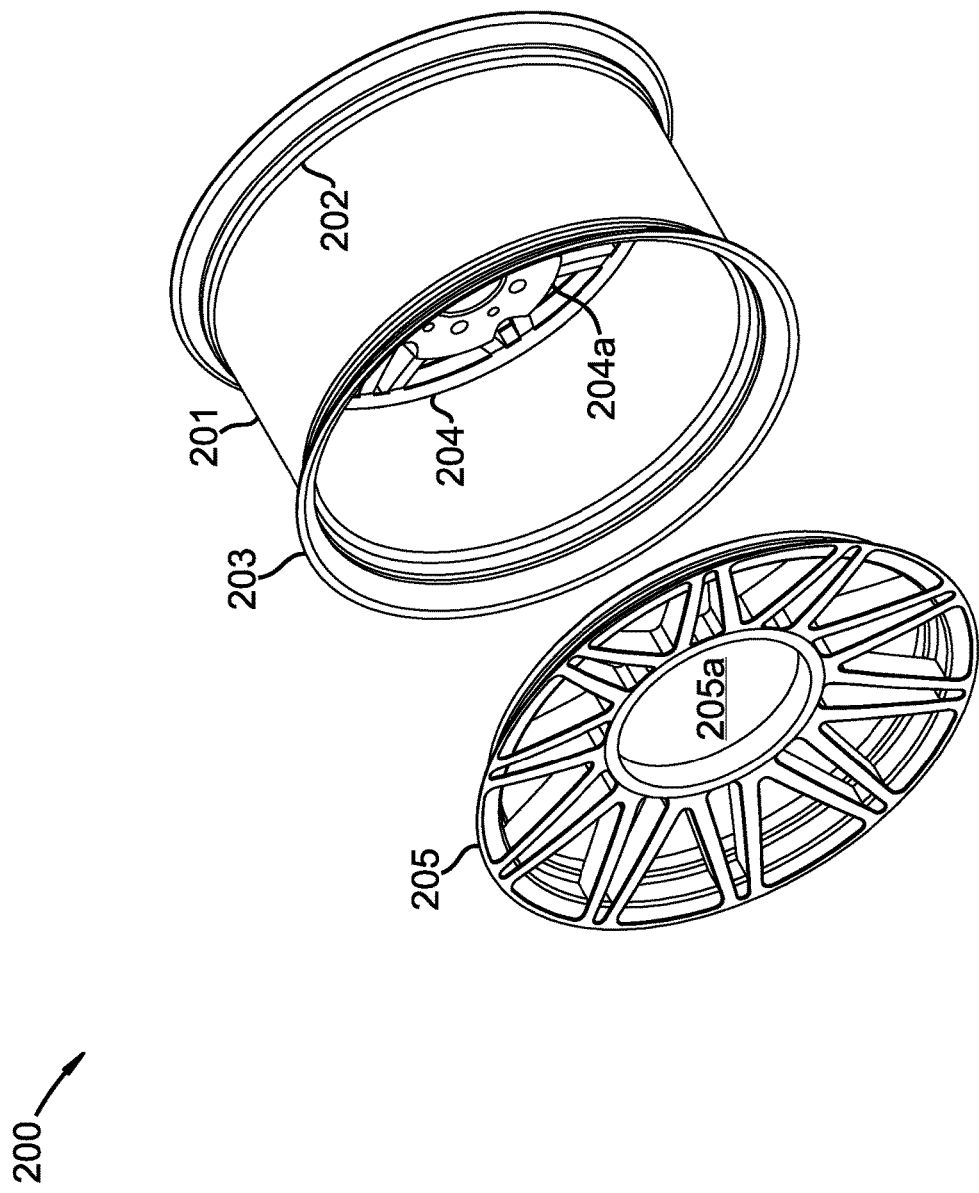
Figure 2D:
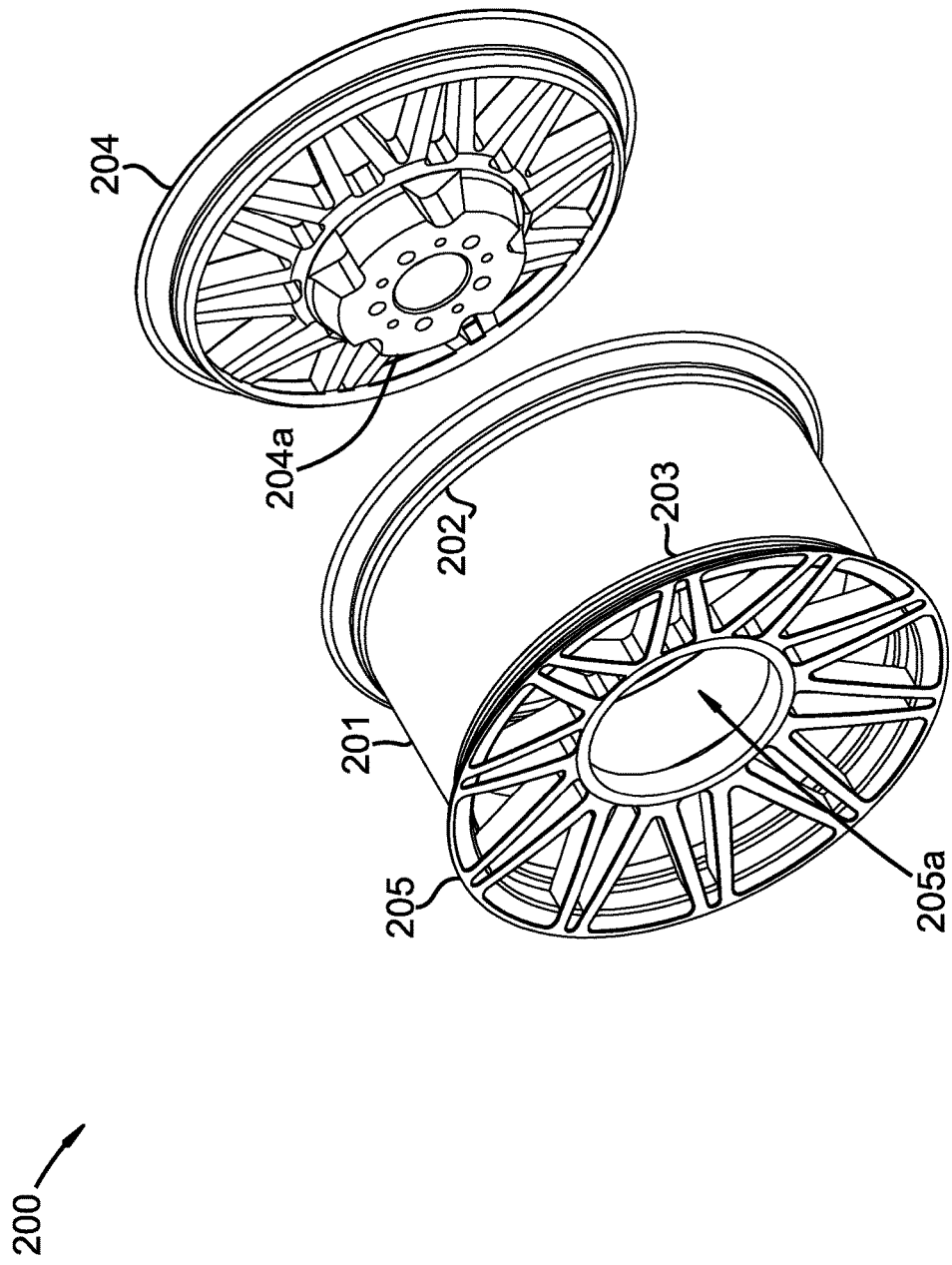
Figure 2E:
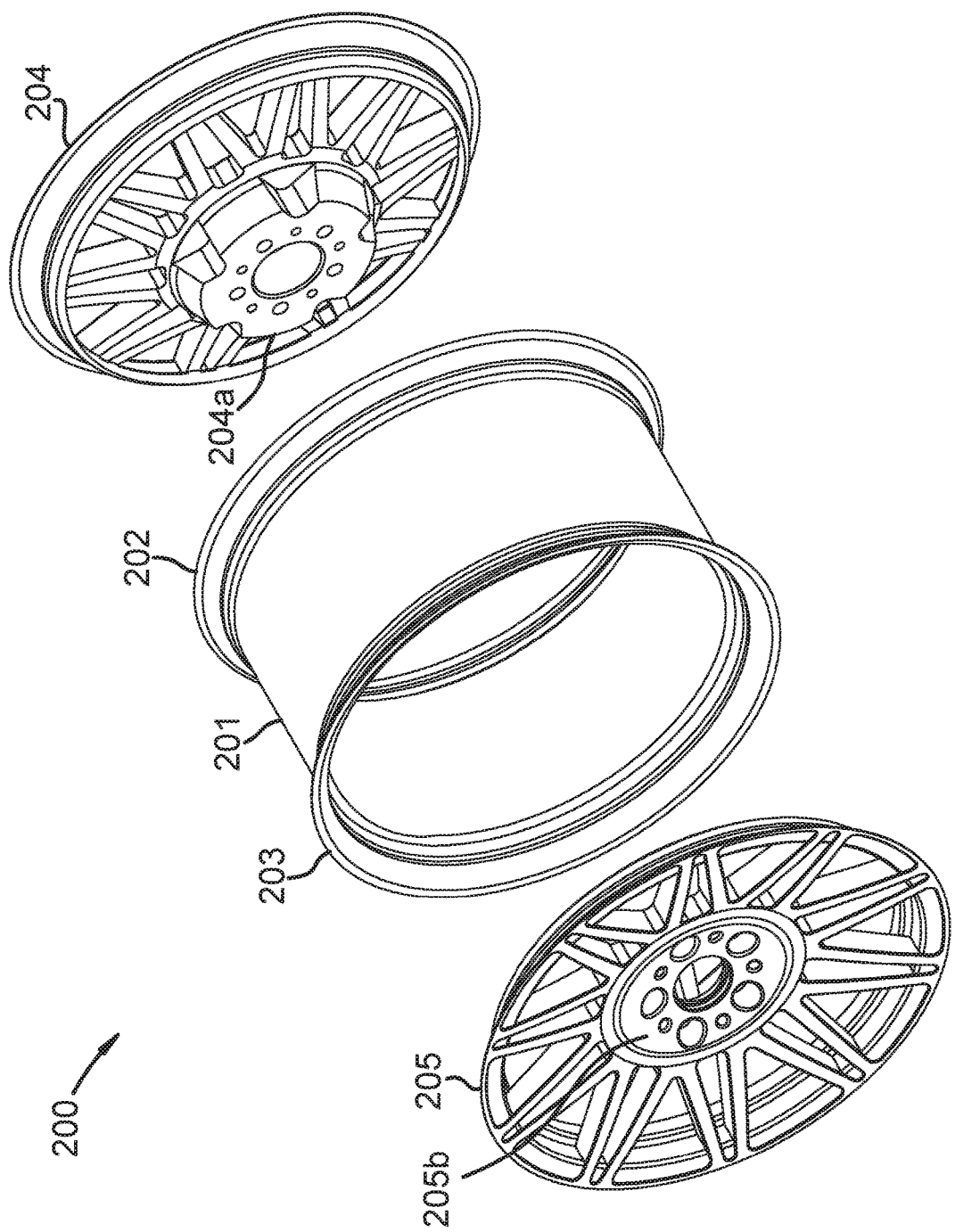
Figure 2F:
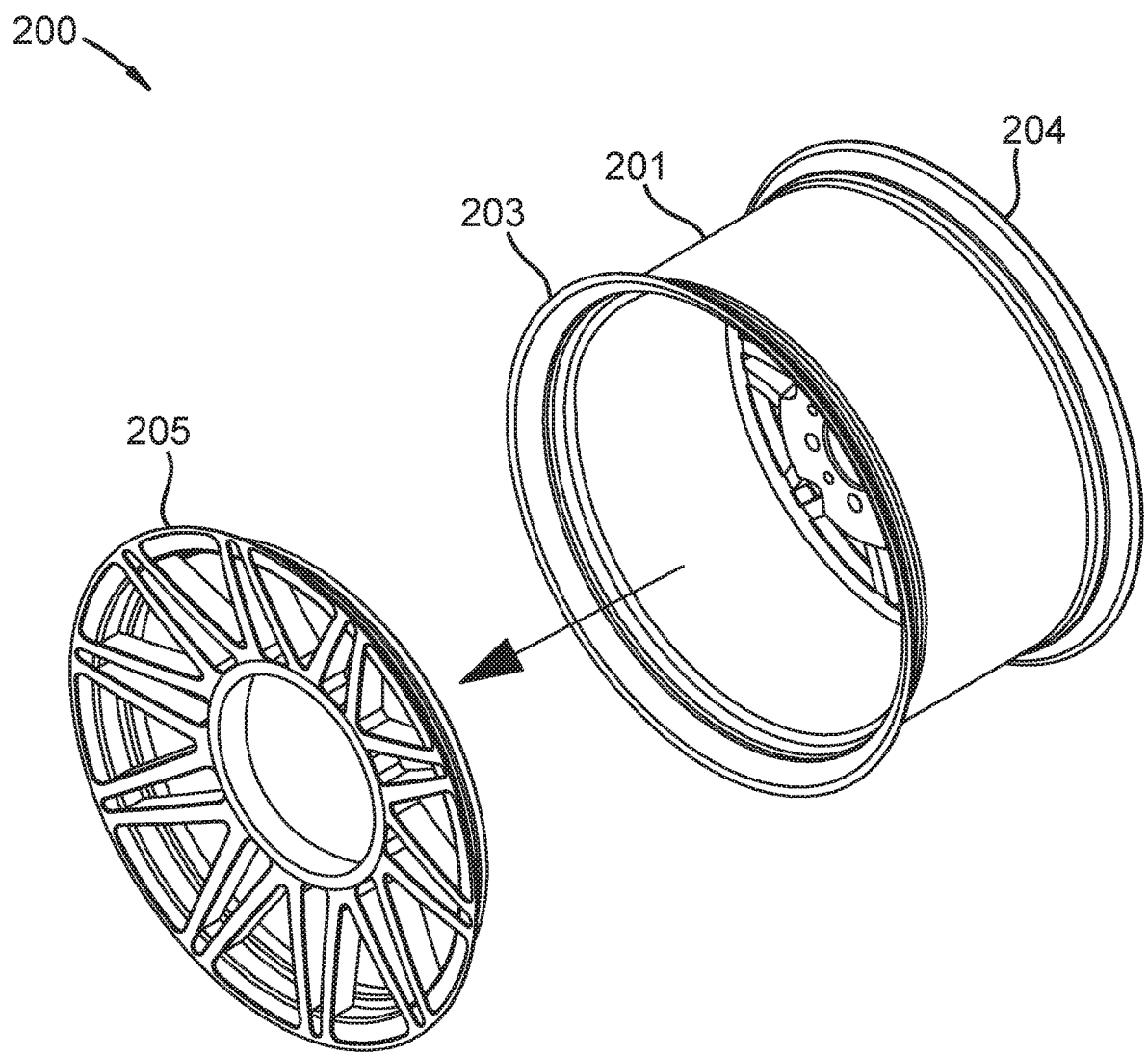

FIG. 1 depicts one embodiment of a vehicle employing a wheel assembly according to the claimed invention. As shown, vehicle 100 is a three-wheeled vehicle. Vehicle 100 includes wheel assembly 101, embodiments of which are described below in more detail. Although the depicted embodiment is a three-wheeled vehicle, in some embodiments, vehicle 100 is a four-wheeled vehicle, a two-wheeled vehicle, a six-wheeled vehicle, or any of a variety of multi-wheeled passenger and/or cargo vehicles. In yet other embodiments, vehicle 100 is an aircraft. In some embodiments, vehicle 100 is even an amphibious vehicle.

FIGS. 2A-F depict various views of a two-faced wheel according to the claimed invention. Wheel 200 includes rim 201, flanges 202, 203, and spoke assemblies 204, 205. Rim 201 is cylindrical and symmetrical. Flange 202 is disposed on a first side of rim 201 corresponding to spoke assembly 204. Flange 203 is disposed on a second side of rim 201 corresponding to spoke assembly 205. Spoke assembly 204 is coupled to flange 202, and includes hub-mounting structure 204a at its center. Hub mounting structure 204a is, in the depicted embodiment, a cylindrical plate having openings through which wheel hub prongs pass. Spoke assembly 205 may be coupled to flange 203 and include hub-mounting structure 205b at its center. Rim 201, flanges 202, 203, spoke assemblies 204, 205, and/or hub-mounting structure 204a are each made of any of a variety of materials suitable for use as a vehicle wheel. Such materials include steel, aluminum alloy, magnesium alloy, and other suitable metal alloys. Those of skill in the art recognize other materials not mentioned that are similarly suitable.

Rim 201 ranges in width from 3 inches to 10 inches, and in diameter from 10 inches to 24 inches. Importantly, rim 201 is wide enough and/or has a large enough diameter to contain a wheel hub and brake assembly (such as those described in more detail below with regard to FIGS. 3A-C) completely between spoke assemblies 204, 205. For example, in the depicted embodiment, spoke assemblies 204, 205 are aligned perpendicular to rim 201. However, in some embodiments, spoke assemblies 204, 205 extend beyond flanges 202, 203 such that spoke assemblies 204, 205 meet rim 201 at an angle greater than 90°, where the centers of spoke assemblies 204, 205 extend beyond either side of rim 201 such that spoke assemblies 204, 205 are convex. In some embodiments, spoke assemblies 204, 205 are only partially convex. Conversely, in some embodiments, spoke assemblies 204, 205 are at least partially concave.

In some embodiments, first and second spoke assemblies 204, 205 are fixedly coupled to rim 201 such that rim 201, flanges 202, 203, and spoke assemblies 204, 205 form a monolithic assembly. In such embodiments, the wheel hub and brake assembly are installed in rim 201 through opening 205a, and opening 205a is large enough to allow the wheel hub and brake assembly to pass through. In other embodiments, one spoke assembly is fixedly coupled to, and monolithic with, rim 201, and the other spoke assembly is removably coupled to rim 201. For example, in one embodiment, spoke assembly 204 is fixedly coupled to rim 201 and spoke assembly 205 is removably coupled to rim 201, for example to allow for brake and/or wheel hub maintenance. In such an embodiment, a mounting arm (such as that described below with regard to FIGS. 4-5) that mounts wheel assembly 200 to a vehicle is removably and rotatably coupled to spoke assembly 204 at hub-mounting structure 204a via the wheel hub, the brake assembly, or both. In another embodiment, spoke assembly 204 is removably coupled to rim 201 and spoke assembly 205 is fixedly coupled to rim 201. Additionally, in such an embodiment, spoke assembly 205 is removably and rotatably coupled to the mounting arm in order to provide support for wheel assembly 200 when spoke assembly 204 is removed. Such an embodiment allows maintenance of the wheel hub and/or brake assembly without removing wheel assembly 200 from the vehicle. In yet other embodiments, both spoke assemblies 204, 205 are removably coupled to rim 201. Such an embodiment allows for more economical changing of wheel design while still maintaining the sleek appearance that alloy wheels have over steel rims with hub caps. The important distinction between spoke assemblies 204, 205 and hub caps is that hub caps couple to a rim over a steel spoke assembly that provides structural support to the rim, whereas spoke assemblies 204, 205 couple to rim 201 and provide structural support to rim 201.

Fixed coupling of spoke assembly 204 or spoke assembly 205 to rim 201 entails a variety of means and processes. In some embodiments, rim 201, spoke assembly 204, and/or spoke assembly 205 are forged, die cast, and/or gravity cast as a monolithic piece. In other embodiments, rim 201, spoke assembly 204, and/or spoke assembly 205 are manufactured separately. In some such embodiments, flange 202 and/or flange 203 is bent over an outer edge of spoke assembly 204 and/or spoke assembly 205, respectively. In other such embodiments, flange 202 and/or flange 203 includes openings that allow spoke assembly 204 and/or spoke assembly 205, respectively, to be bolted to the respective flanges. The flange openings are, in some embodiments, threaded, and in others, smooth. Spoke assembly 204 and/or spoke assembly 205 also include openings through which they are bolted to flange 202 and/or 203, respectively, threaded and/or smooth. In one specific embodiment, flange 202 and/or flange 203 are thickened and the openings only pass partially through the corresponding flange to protect a tire mounted to rim 201 from the bolts that mount the spoke assemblies to the flanges. In another specific embodiment, openings are unthreaded, with a sex bolt through the flange-side and a mating screw through the spoke assembly-side. Once the spoke assemblies are bolted to the flanges, the bolts are welded or otherwise fused to the rim and/or spoke assemblies.

Removable coupling includes the bolting means discussed above, without fusing the bolts to wheel assembly 200. Additionally, in some embodiments, removable coupling includes clipping the spoke assemblies to the flanges with flexible metal strips. Additionally, in some embodiments, one or more of the spoke assemblies are magnetically or electromagnetically mounted to the flanges. In such embodiments, the flanges and/or the spoke assemblies include corresponding magnets and/or electromagnets. Such magnets are strong enough to withstand forces a wheel experiences during a variety of driving conditions, especially in turning.

Spoke assemblies 204, 205 include a variety of designs. Some embodiments, such as that depicted, include alternating openings and arms. Various embodiments include arms and/or openings of various sizes. Additionally, in some embodiments, spoke assemblies 204, 205 are solid from the center to rim 201. Functional designs are also envisioned. For example, in one embodiment, spoke assembly 205 is rotatably coupled to rim 201, such as by a bearing, such that spoke assembly 205 rotates freely with respect to rim 201 and any structure mounting wheel assembly 200 to a vehicle, while still providing structural support to rim 201.

Figure 3A:
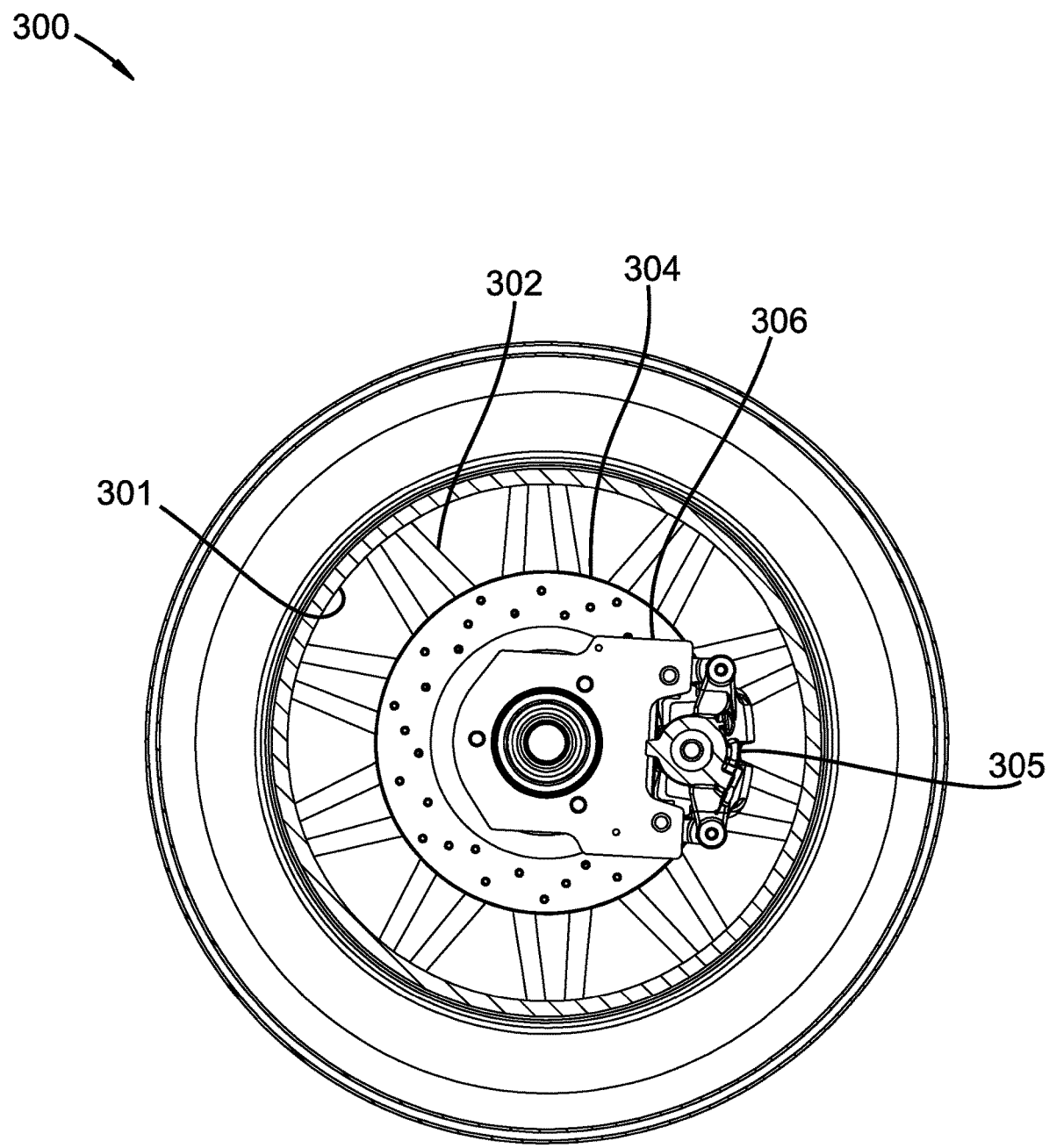
FIGS. 3A-D depict various views of a wheel hub and rotor for use in a wheel assembly according to the claimed invention.
Figure 3B:
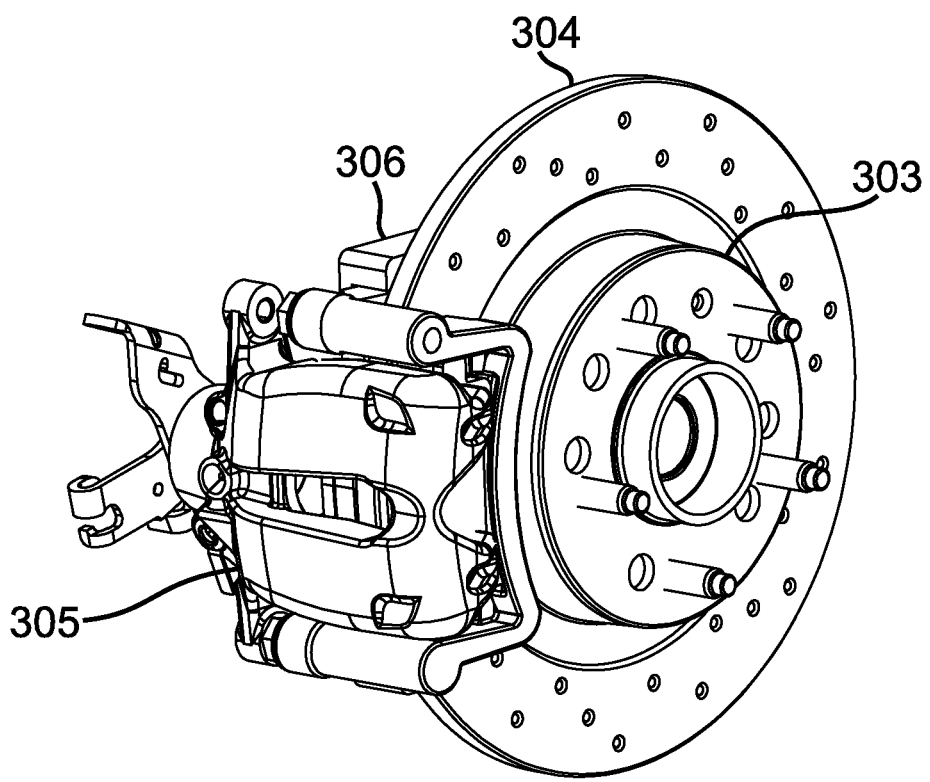
Figure 3C:
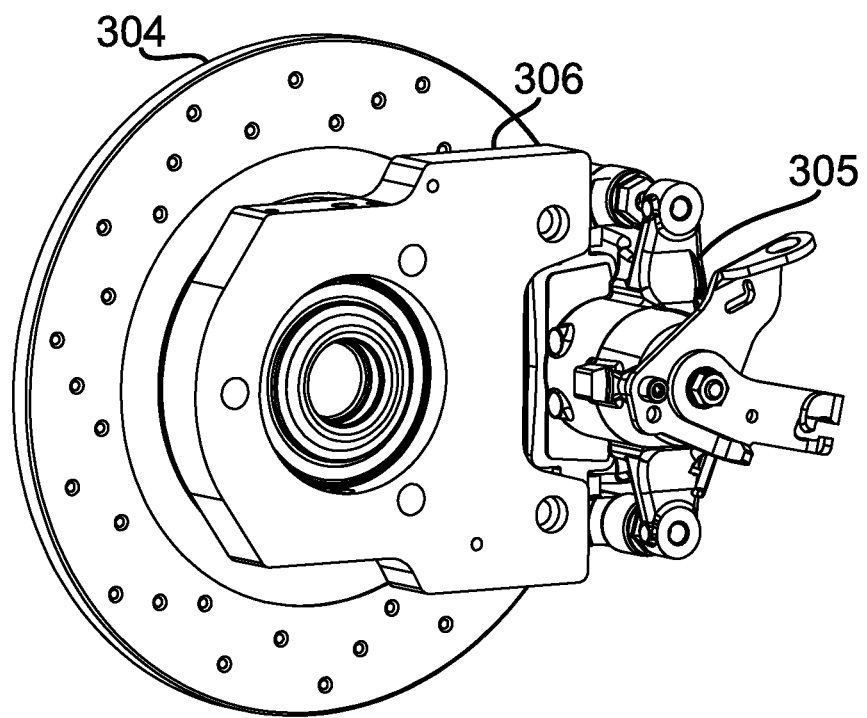
Figure 3D:
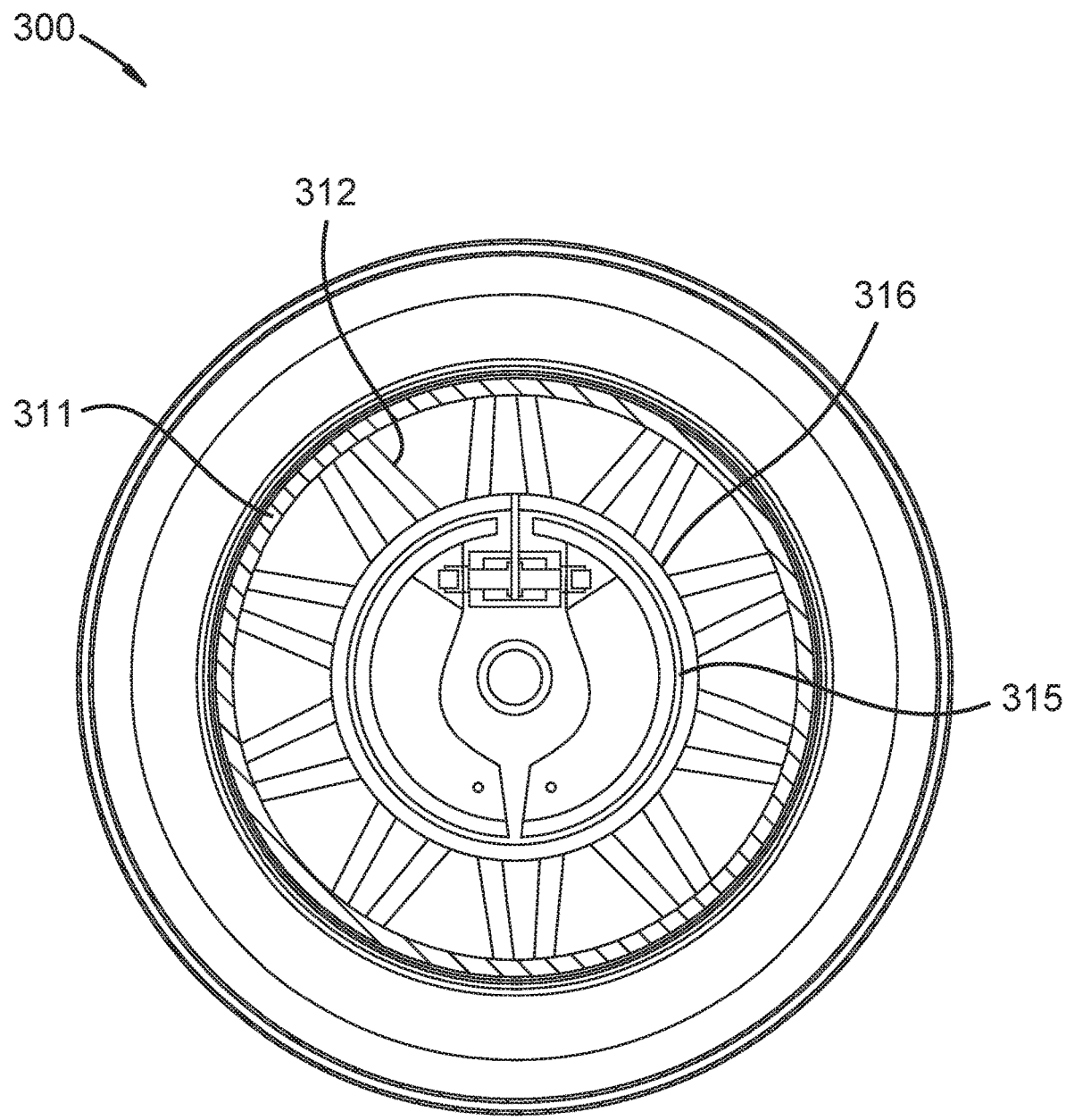

FIGS. 3A-C depict various views of a wheel hub and rotor for use in a wheel assembly according to the claimed invention. FIG. 3A is a back view of a wheel assembly according to the claimed invention with the second spoke assembly removed. FIGS. 3B-C depict front and back views of the wheel hub and rotor. As shown, wheel assembly 300 includes rim 301, spoke assembly 302, wheel hub 303, rotor 304, brake pad 305, and vehicle mount 306.

Wheel hub 303 is disposed inside rim 301 between spoke assembly 302 and the second spoke assembly (such as that depicted in FIGS. 2A-D), and is coupled to a hub-mounting structure in spoke assembly 302 (again, such as that depicted in FIGS. 2A-D). Wheel hub 303 includes prongs 303a that are threaded. Wheel hub 303 is secured to the cylindrical plate by nuts corresponding to each threaded prong. Additionally, in the depicted embodiment, wheel hub 303 and rotor 304 are monolithic.

Rotor 304 and brake pad 305 together form is a disc brake assembly. The brake assembly is disposed inside rim 301 and is fixedly coupled to the hub-mounting structure via wheel hub 303. In embodiments where rotor 304 and wheel hub 303 are separate pieces, the brake assembly is simply coupled to wheel hub 303. Although the depicted embodiment shows the brake assembly as a disc brake assembly, in some embodiments, the brake assembly is a drum brake assembly. In some such embodiments, one or more brake pads are forced against an interior wall of rim 301. Wheel assembly 300 includes rim 311, spoke assembly 312, drum brake assembly 315, and vehicle mount 316.

Vehicle mount 306 rotatably couples rotor 304 and/or wheel hub 303 to the vehicle, such as via the mounting arm described below with regard to FIGS. 4-5 Vehicle mount 306 also fixedly couples brake pad 305 to the vehicle. Alternatively, in some embodiments, vehicle mount 306 is rotatably coupled to the second spoke assembly to provide additional support for rim 301. For example, in one embodiment, vehicle mount 306 extends into the opening of the second spoke assembly and couples to the second spoke assembly by a bearing.

Figure 4:
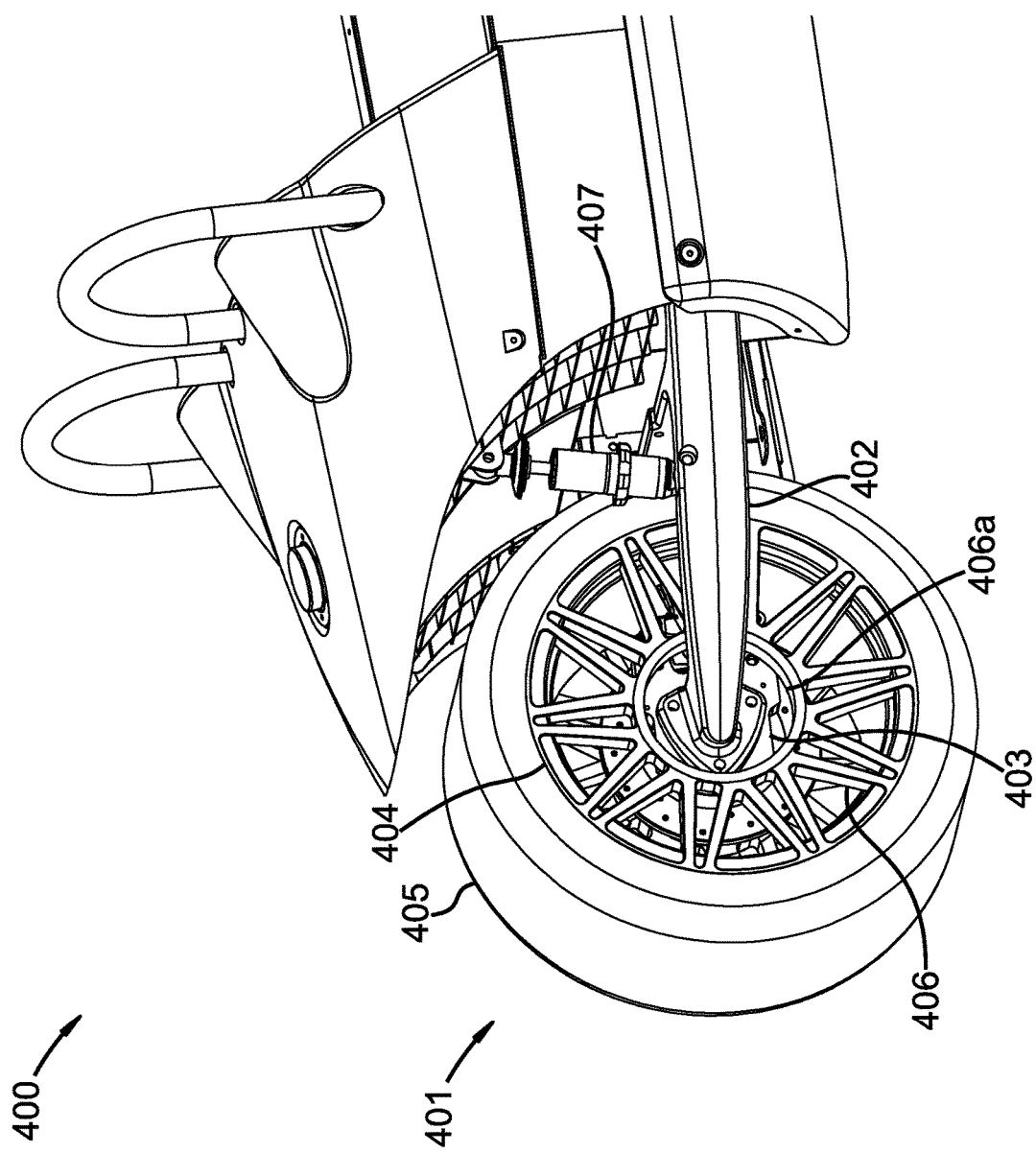
FIG. 4 depicts an embodiment of a mounting arm coupling a wheel assembly according to the claimed invention to a vehicle.

FIG. 4 depicts an embodiment of a mounting arm coupling a wheel assembly according to the claimed invention to a vehicle. Vehicle 400 includes wheel assembly 401 and mounting arm 402. Wheel assembly 401 includes rim 404, tire 405 disposed around rim 404 between flanges of rim 404, and spoke assemblies 406 disposed on either side of rim 404 enclosing a wheel hub and brake assembly within rim 404. Mounting arm 402 is coupled to wheel assembly 401 by mounting plate 403, similar to vehicle mount 306 described above. In other embodiments, mounting arm 402 is coupled to the hub-mounting structure, the wheel hub, or the brake assembly, either directly, or indirectly via the vehicle mount. Mounting arm 402 passes through opening 406a in spoke assembly 406, and couples wheel assembly 401 to the vehicle.

Mounting arm 402 is pivotally coupled to a vehicle frame member, and motion of mounting arm 402 is damped by shock 407. Mounting arm 402, in some embodiments, wraps around a vehicle-side of wheel assembly 401 and pivotally couples to the vehicle frame member between wheel assembly 401 and the vehicle frame. Mounting arm 402 is made of any of a variety of materials, including steel, aluminum alloy, and other metal alloys.

Figure 5:
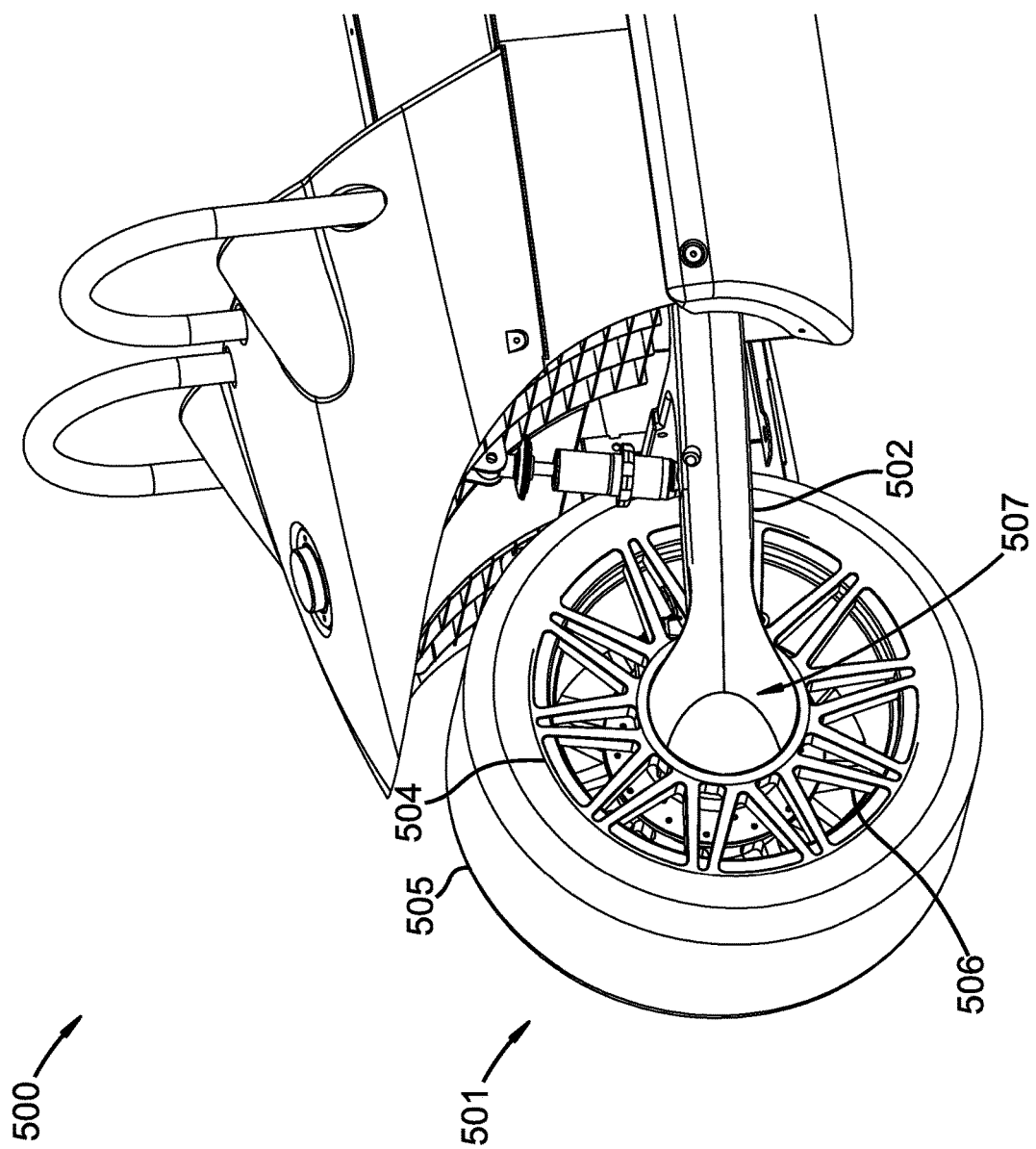
FIG. 5 depicts another embodiment of a mounting arm coupling a wheel assembly according to the claimed invention to a vehicle.

FIG. 5 depicts another embodiment of a mounting arm coupling a wheel assembly according to the claimed invention to a vehicle. Vehicle 500 includes wheel assembly 501 and mounting arm 502, similar to vehicle 400 described above. Wheel assembly 501 includes rim 504, tire 505 disposed around rim 504 between flanges of rim 504, and spoke assemblies 506 disposed on either side of rim 504 enclosing a wheel hub and brake assembly within rim 504. Different from the embodiment of FIG. 4, however, spoke assembly 506 includes support structure 507 disposed in the opening of spoke assembly 506. Support structure 507 is fixedly coupled to mounting arm 502 and rotatably coupled to spoke assembly 506. In some embodiments, such as that depicted, support structure 507 is integrated with mounting arm 502 such that support structure 507 and mounting arm 502 are monolithic. In other embodiments, a mounting plate (similar to that described above with regard to FIG. 3) is the support structure.

FIGS. 6A-D depict various embodiments of a spoke assembly according to the claimed invention incorporating a removable hub-mounting structure. Wheel assembly 600 is similar to those described above, and includes rim 601, spoke assembly 602, a second spoke assembly not depicted, and hub-mounting structure 603 at the center of spoke assembly 602. The second spoke assembly is disposed opposite the depicted spoke assembly 602 and includes an opening through which a mounting arm passes. The spoke assemblies are fixedly coupled to rim 601, and enclose wheel hub 604 and brake assembly 605. Wheel hub 604 and brake assembly 605 are coupled to the mounting arm, the second spoke assembly, and hub-mounting structure 603. However, hub-mounting structure 603 is removably coupled to spoke assembly 602, thereby allowing for simple maintenance of wheel hub 604 and/or brake assembly 605 while wheel assembly 600 is still mounted to a vehicle.

Figure 6A:
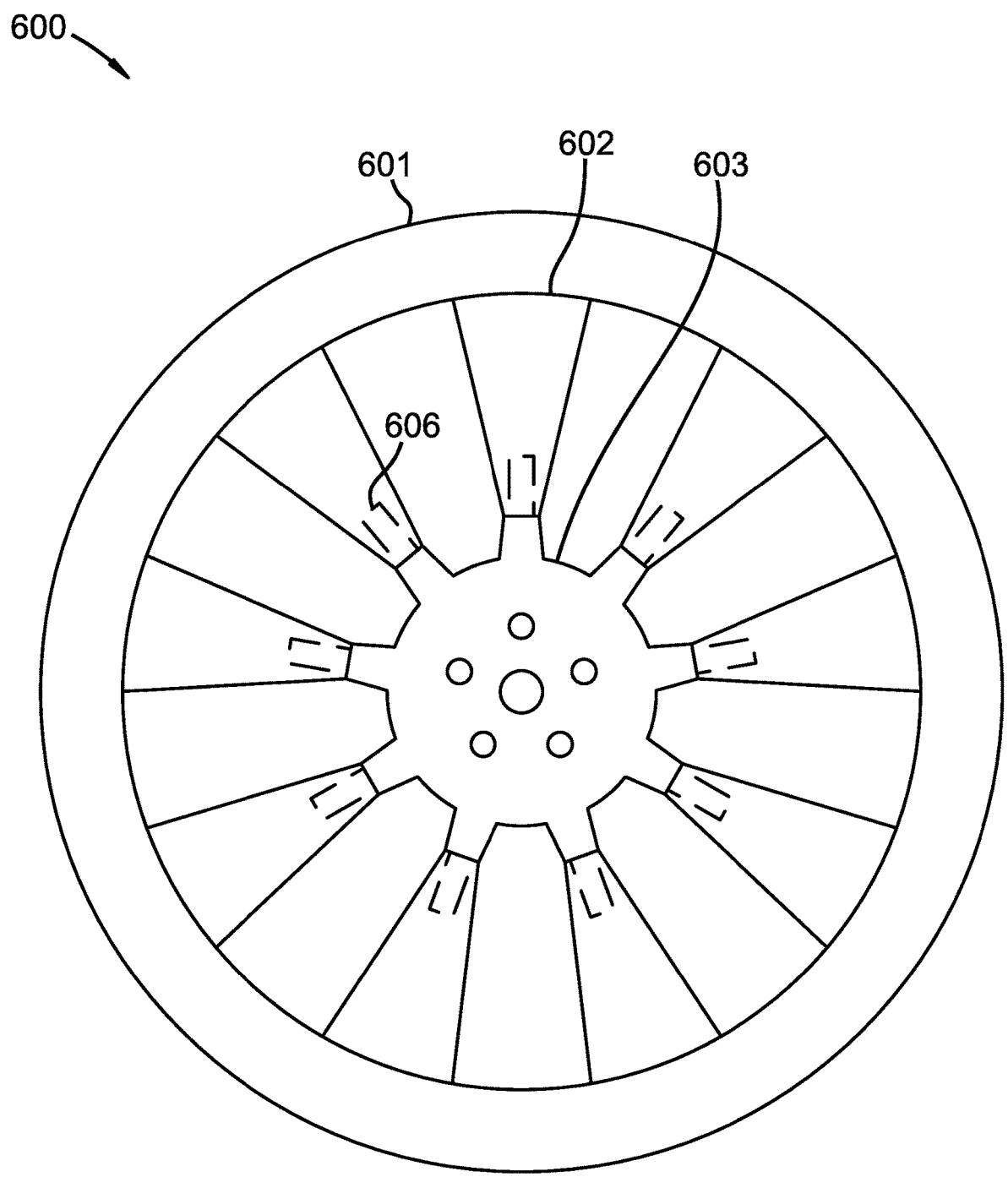
FIGS. 6A-D depict various embodiments of a spoke assembly according to the claimed invention incorporating a removable hub-mounting structure.
Figure 6B:
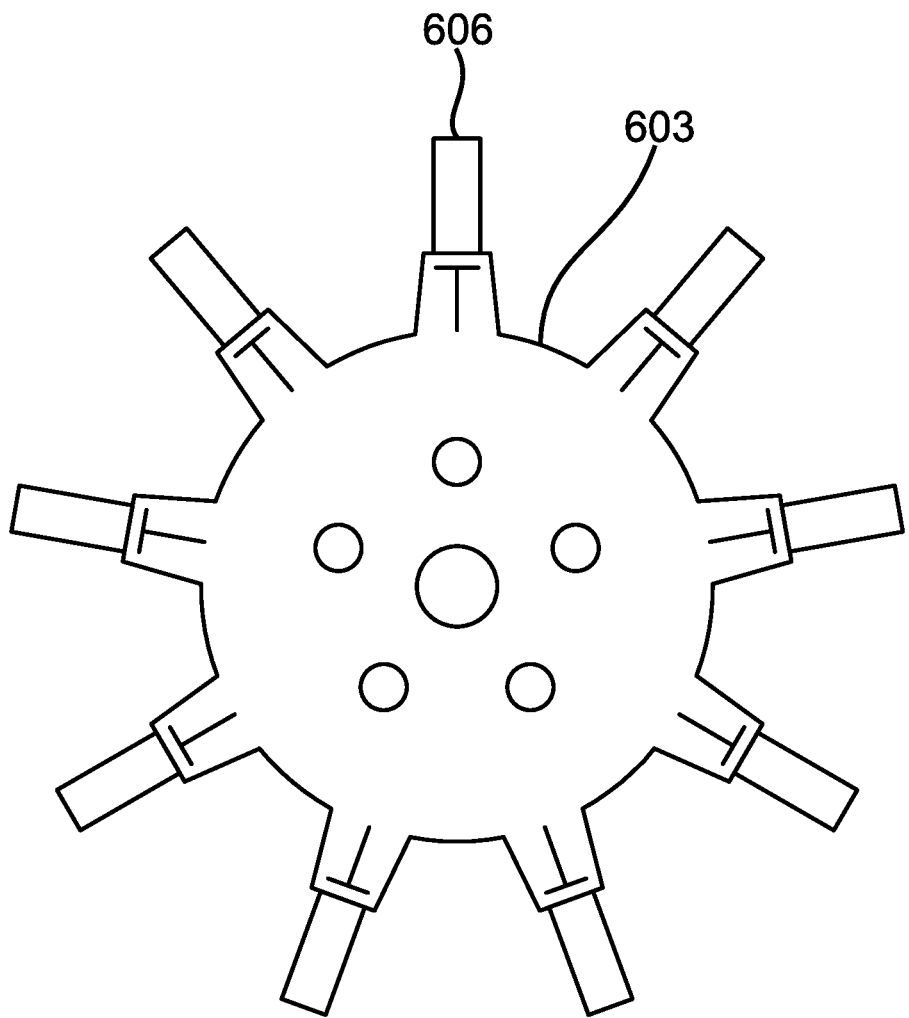
Figure 6C:
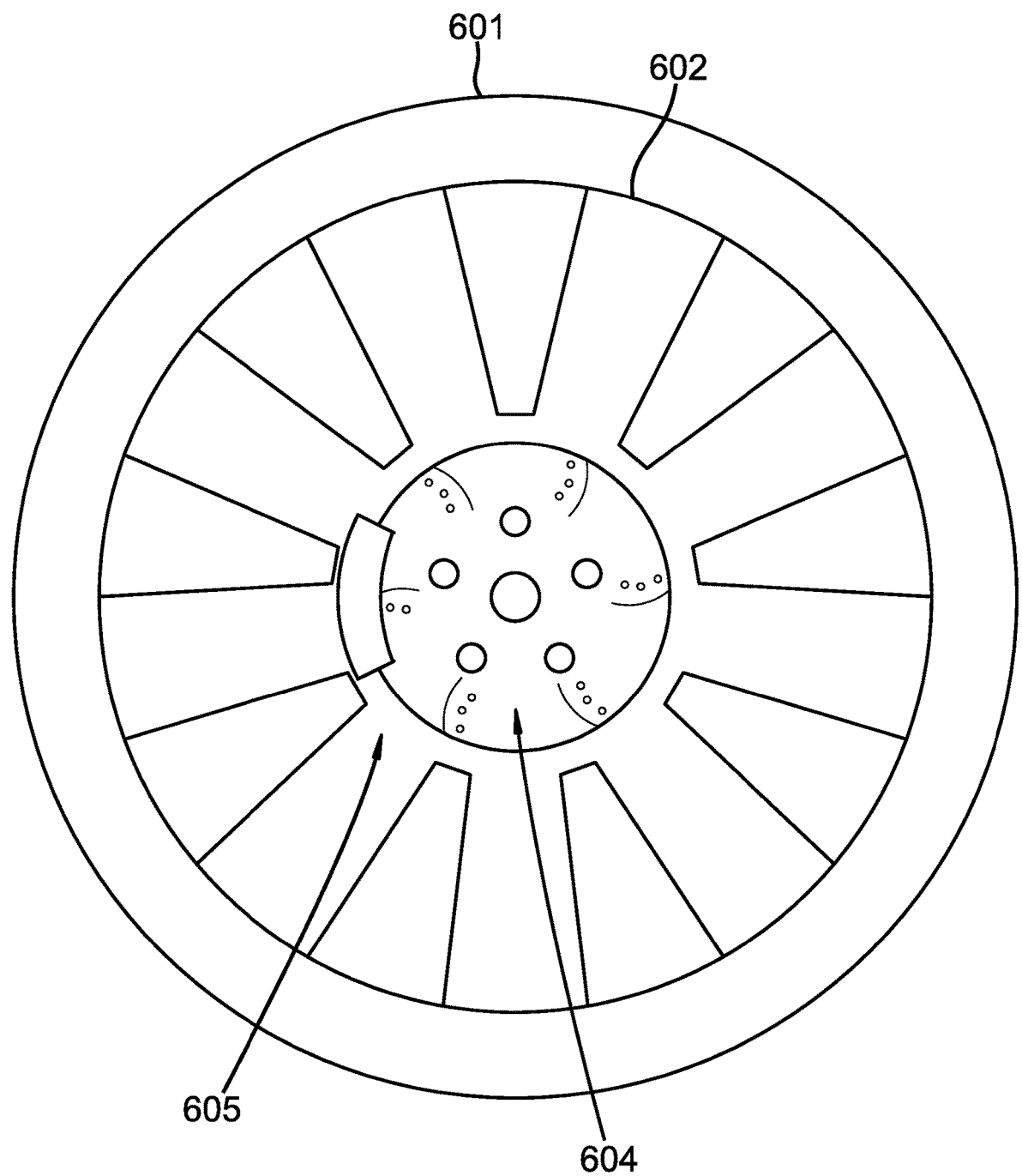

As shown in FIGS. 6A-B, in some embodiments, hub-mounting structure 603 includes slideable rods 606. In such embodiments, spokes of spoke assembly 602 are at least partially bored to accept rods 606. Rods 606 extend into the bores to mount hub-mounting structure 603 to spoke assembly 602. In some such embodiments, rods 606 can be locked in place to prevent hub-mounting structure 603 from detaching from spoke assembly 602 at unwanted times, during vehicle operation, or to prevent theft of hub-mounting structure 603 and/or the components disposed within wheel assembly 600. For example, in one embodiment, rods 606 are deadbolt-style rods that can only be retracted from spoke assembly 602 into hub-mounting structure by rotating a keyed interface. In other embodiments, however, rods 606 are not locked, and are simply held in place by spring-loaded levers.

Figure 6D:
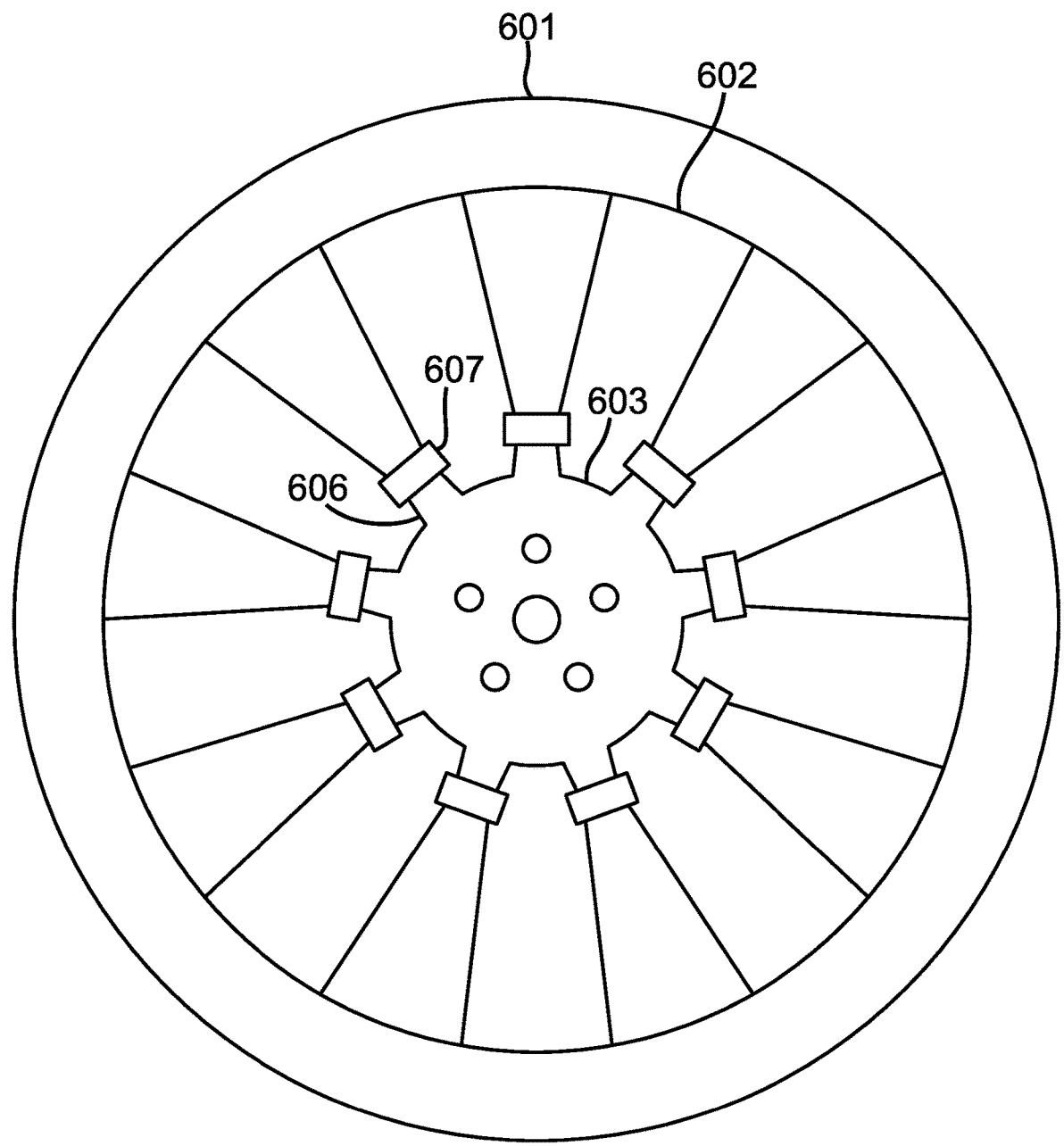

As shown in FIG. 6D, in some embodiments, hub-mounting structure 603 is coupled to spoke assembly 602 by clamps 607. Clamps 607 wrap around, and lock together, hub spokes extending outwards from hub-mounting structure 603 and outer spokes extending inwards from rim 601. In some such embodiments, rods extend into the outer spokes from the hub spokes. Examples of clamps 607 include clamshell-type clamps, marman rings, cardellini clamps, and others.

Though not depicted, in some embodiments, spoke assembly 602 and/or the second spoke assembly is divided into two or more segments. For example, in one embodiment, spoke assembly 602 is divided in half. In some such embodiments where the spoke assemblies are segmented, at least one segment is fixedly coupled to rim 601, and at least one segment is removably coupled to rim 601, such as is described above with regard to FIGS. 2A-D. In some embodiments, all spoke assembly segments are removably coupled to rim 601.

We claim:

1. A wheel assembly for a motorized passenger or cargo vehicle, the wheel assembly comprising:
   a cylindrical symmetrical rim having a first flange on a first side of the rim and a second flange on a second side of the rim, each flange encircling the rim;
   a tire around the rim between the flanges;
   a first spoke assembly coupled to the first flange and having a hub-mounting structure at the center of the first spoke assembly;
   a second spoke assembly coupled to the second flange and having an opening at the center of the second spoke assembly;
   a wheel hub between the first and second spoke assemblies, and coupled to the hub-mounting structure;

a brake assembly coupled to one or more of the wheel hub or the hub-mounting structure;

a mounting arm coupled to one or more of the hub-mounting structure, the wheel hub, or the brake assembly, and passing through the opening, the mounting arm pivotably coupled to a vehicle frame member, coupling the wheel assembly to the motorized passenger or cargo vehicle.

2. The vehicle wheel assembly of claim 1, the second spoke assembly further comprising a hub-mounting structure in the opening fixedly or rotatably coupling the second spoke assembly to the wheel hub, the brake assembly, or both.

3. The vehicle wheel assembly of claim 1, the second spoke assembly further comprising a support structure in the opening fixedly coupled to the arm and rotatably coupled to the second spoke assembly.

4. The vehicle wheel assembly of claim 3, wherein the support structure is integrated with the arm such that the support structure and the arm are monolithic.

5. The vehicle wheel assembly of claim 1, wherein the brake assembly is a disc brake assembly.

6. The vehicle wheel assembly of claim 5, wherein a brake pad of the disc brake assembly is fixedly coupled to the mounting arm, and wherein a disc of the disc brake assembly is rotatably coupled to the mounting arm.

7. The vehicle wheel assembly of claim 1, wherein the brake assembly is a drum brake assembly.

8. The vehicle wheel assembly of claim 7, wherein the drum brake assembly comprises one or more brake pads forced against an interior wall of the rim.

9. The vehicle wheel assembly of claim 1, wherein the hub-mounting structure comprises a cylindrical plate having one or more openings through which one or more threaded bolts on the wheel hub pass, the wheel hub secured to the cylindrical plate by one or more nuts, each corresponding to one of the threaded bolts.

10. The vehicle wheel assembly of claim 1, wherein either (a) the first and second spoke assemblies are fixedly coupled to the rim, (b) the first spoke assembly is fixedly coupled to the rim and the second spoke assembly is removably coupled to the rim, (c) the first spoke assembly is removably coupled to the rim and the second spoke assembly is fixedly coupled to the rim, or (d) the first and second spoke assemblies are removably coupled to the rim.

11. The vehicle wheel assembly of claim of claim 10, wherein the first spoke assembly is removably coupled to the rim and the second spoke assembly is fixedly coupled to the rim, and wherein the second spoke assembly is rotatably coupled to the arm such that the arm provides support for the rim.

12. The vehicle wheel assembly of claim 10, wherein the first and second spoke assemblies are fixedly coupled to the rim, wherein the second spoke assembly is rotatably coupled to the arm, and wherein the hub-mounting structure is removably coupled to the first spoke assembly.

13. The vehicle wheel assembly of claim 12, wherein the removable hub-mounting structure comprises slideable rods corresponding to bored spokes of the first spoke assembly, wherein the rods extend outwards radially from the hub-mounting structure into the spokes.

14. The vehicle wheel assembly of claim 12, wherein the removable hub-mounting structure comprises hub spokes and clamps around an outside end of each hub spoke, wherein the first spoke assembly comprises outer spokes corresponding to each hub spoke, and wherein the clamps clamp the hub spokes to the outer spokes.

15. The vehicle wheel assembly of claim 1, wherein the first spoke assembly, the second spoke assembly, or both, comprise a first set of spokes fixedly coupled to the rim and a second set of spokes removably coupled to the rim.

16. The vehicle wheel assembly of claim 15, wherein the first and second sets of spokes each comprise half the total number of spokes of the first or second spoke assembly.

17. The vehicle wheel assembly of claim 1, wherein the first spoke assembly, the second spoke assembly, or both, comprise first and second sets of spokes, each set removably coupled to the rim.

18. The vehicle wheel assembly of claim 17, wherein the first and second sets of spokes each comprise half the total number of spokes of the first or second spoke assembly.

19. The vehicle wheel assembly of claim 1, wherein the second spoke assembly is rotatably coupled to the rim such that the second spoke assembly rotates freely with respect to the rim and the arm.

* * * * *